(12) United States Patent
Arzig

(10) Patent No.: US 7,751,906 B2
(45) Date of Patent: Jul. 6, 2010

(54) METHOD AND AUTOMATION SYSTEM FOR OPERATION AND/OR OBSERVING AT LEAST ONE FIELD DEVICE

(75) Inventor: Klaus Arzig, Feucht (DE)

(73) Assignee: Siemens AG, Munich (DE)

( * ) Notice: Subject to any disclaimer, the term of this patent is extended or adjusted under 35 U.S.C. 154(b) by 548 days.

(21) Appl. No.: 11/665,662

(22) PCT Filed: Sep. 27, 2005

(86) PCT No.: PCT/EP2005/054828

§ 371 (c)(1),
(2), (4) Date: Apr. 18, 2007

(87) PCT Pub. No.: WO2006/042779

PCT Pub. Date: Apr. 27, 2006

(65) Prior Publication Data

US 2007/0294361 A1 Dec. 20, 2007

(30) Foreign Application Priority Data

Oct. 18, 2004 (DE) .................. 10 2004 051 130

(51) Int. Cl.
*G05B 15/00* (2006.01)
*G05B 11/01* (2006.01)
(52) U.S. Cl. .................. 700/17; 700/1; 700/83
(58) Field of Classification Search .......... 700/1, 700/17, 83
See application file for complete search history.

(56) References Cited

U.S. PATENT DOCUMENTS 6,317,701 B1 * 11/2001 Pyotsia et al. .............. 702/188
7,120,820 B2 10/2006 Lehmann
2001/0056304 A1 12/2001 Nitta
2003/0140270 A1 7/2003 Lehmann
2005/0041653 A1 2/2005 Arnold et al.

FOREIGN PATENT DOCUMENTS

| CA | 2052926 | 4/1992 |
|---|---|---|
| DE | 40 32 033 A1 | 4/1992 |
| DE | 44 16 795 C2 | 11/1995 |
| DE | 100 30 329 C1 | 1/2002 |
| DE | 102 34 149 A1 | 4/2003 |

OTHER PUBLICATIONS

Seifert, XP 000591478 "Fehlertoleranter InterBus mit doppeltem Fernbus", ETZ, dated 1996, pp. 14-16.

* cited by examiner

*Primary Examiner*—Ronald D Hartman, Jr.
(74) *Attorney, Agent, or Firm*—Laurenc A. Greenberg; Werner H. Stemer; Ralph E. Locher

(57) ABSTRACT

The object is to provide a method for operating and/or observing at least one field device in the simplest possible manner. A first central control device which executes the automation engineering software generates a first command to control the at least one field device and transmits the first command to the at least one field device. At least a second central control device which executes the automation engineering software generates a similar second command for controlling the at least one field device and transmits the second command to the at least one field device. The at least one field device receives the transmitted first and second commands and executes at least one of the received commands. An automation system for carrying out the method is also provided.

14 Claims, 3 Drawing Sheets

METHOD AND AUTOMATION SYSTEM FOR OPERATION AND/OR OBSERVING AT LEAST ONE FIELD DEVICE

BACKGROUND OF THE INVENTION

Field of the Invention

In order to control a wide variety of systems and processes, so-called automation systems are generally used nowadays. The systems and processes to be controlled may be, for example, chemical or industrial processes, industrial manufacturing processes or distribution processes for energy, gas or water. It may also be a distribution process for items of information via data or communications networks.

Such systems and processes which are to be controlled in automated fashion often have so-called field devices fitted in the vicinity of the process by means of which measurement signals are picked up from the process or the system and by means of which it is possible to influence the process or the system using actuators. Such field devices may be, for example, control or protection field devices, whereby the term "field device" is not restricted exclusively to a use in the field, but may also include, for example, those devices which are used in buildings automation or in telecommunications systems.

Said field devices are often connected, via data links, to a central control device, from which they receive commands to be implemented and to which they pass on measurement data and messages generated from picked-up measurement signals.

In order to minimize the risk of failure of an automation system, various components are generally designed to be redundant, i.e. to be at least in duplicate, with the result that, in the event of failure of a first component, the corresponding function can be taken over by a redundant component. Thus, for example, the data link between a central control device and the field devices is usually designed to be redundant. This may mean, for example, that all data lines are provided in duplicate or are formed in a ring structure.

Furthermore, central control devices are generally also designed to be redundant. For this purpose it is generally conventional to provide two central control devices, of which one, as the leading central control device, normally takes on the function of the complete control of the automation system. Via a high-performance synchronization data transmission line, this leading central control device is connected to a further central control device, which carries out precisely the same actions, synchronized in time, as the leading central control device. In the event of the leading central control device failing, it is then possible simply to switch over to the further central control device, and the automation system can continue to be operated without any interruption.

SUMMARY OF THE INVENTION

The invention is based on the object of specifying a method and an automation system for operating and/or observing at least one field device which can be run with as little complexity as possible.

In order to achieve this object as regards the method, the invention proposes a method for operating and/or observing at least one field device, in which a first central control device implementing automation software produces a first command for controlling the at least one field device and transmits this first command to the at least one field device, at least one further central control device implementing the automation software produces a second similar command for controlling the at least one field device and transmits this second command to the at least one field device, and the at least one field device receives the transmitted first and second commands and implements at least one of the received commands.

By virtue of the fact that the two central control devices implement the same automation software independently of one another and in each case transmit similar first and second commands to the at least one field device, complex synchronization of the central control devices is no longer required.

The method according to the invention is based on the knowledge that, in most cases, it is possible to dispense with synchronization of the central control devices since these implement the same automation software in the same way and therefore, although they do not function synchronously in time, they generate similar commands, i.e. ones with the same contents, and respond in the same way. Although, in the method according to the invention, some commands are transmitted a plurality of times to the at least one field device, the field device repeatedly carrying out a similar command usually produces only one error message. Thus, for example, a circuit breaker in an energy distribution network, cannot be tripped again if it has already been tripped previously.

However, in order that, precisely in the case of complex automation systems, the at least one field device does not implement all of the commands a plurality of times, in accordance with one advantageous development of the method according to the invention provision may be made for the at least one field device only to implement that command of the similar first and second commands which it receives first. In this case, when a new command is input, the field device tests whether a similar command has already been input before and ignores it, if appropriate. As a result, only those commands are implemented which the field device receives first. Such a check can be realized comparatively simply, as a result of which the complexity for the entire automation system remains low.

If the field device itself also produces messages and measurement data, for example from measurement signals from connected sensors, provision may advantageously be made for the at least one field device to produce measurement data and/or messages and to transmit them both to the first central control device and to the at least one further central control device. In this way, all the central control devices are supplied with the same input information items from the at least one field device, as a result of which data matching of the central control devices with one another is not necessary.

In accordance with one advantageous embodiment of the method according to the invention, provision may furthermore be made for the at least one field device, whilst implementing a received command, to block the acceptance of further commands. This prevents, for example, a situation in which contradictory commands are to be implemented virtually simultaneously (for example opening and closing of a circuit breaker). In addition, this may prevent a situation in which the implementation of a command comprising a plurality of individual commands (command sequence) is interrupted by a command not belonging to the command sequence.

In addition, in accordance with a further advantageous embodiment of the method according to the invention, provision may be made for the at least one field device, once a command has been received, to block the acceptance of a similar command for a predetermined period of time. In this way, the implementation of the same command within a predetermined period of time can be prevented in a very simple manner. Once the period of time has elapsed, however, the command can be implemented again. In this case, the period of time should be such that it only prevents the implementation of those commands which are produced a plurality of times by the asynchronous operation of the central control devices.

A further advantageous embodiment of the method according to the invention also provides for the at least one field device, in order to check whether a received command has already been implemented, to store all of the implemented commands in a list of commands and to check whether this received command is already stored in the list of commands, and to block the implementation of those commands which are already stored in the list of commands.

In this context, in addition provision may also be made for the at least one field device only to block the implementation of the last n commands which have been stored in the list of commands, where n is a predeterminable number of commands. This in turn ensures that the field device only blocks those commands which are actually redundant and, after the occurrence of a command, does not prevent it from ever being implemented.

As an alternative to this, in this context provision may also be made for stored commands to be deleted again from the list of commands after a predeterminable period of time. On the one hand, this in turn achieves a situation in which only actually redundant commands are not implemented a plurality of times and, on the other hand, the memory space requirement of the list of commands is minimized.

In accordance with a further advantageous embodiment of the method according to the invention, provision is also made for the central control devices to receive instructions from local operating devices associated with them in each case and, from them, to produce the first and second commands for the at least one field device; likewise the central control devices receive measurement data and/or messages from the at least one field device and transmit them to the local operating devices. In this way, the central control devices can be operated by means of local operation.

A further advantageous embodiment of the method according to the invention provides for the central control devices to receive instructions from at least one control center device which is at a higher level than them and, from them, to produce the first and second commands for the at least one field device; likewise the central control devices receive measurement data and/or messages from the at least one field device and transmit them to the control center device. In this way, the central control devices can be operated in a simple manner by means of a higher-level control center device. In this case, the control center device may be provided as an alternative to local operation or in addition to this.

In this context, in accordance with a further advantageous embodiment of the method according to the invention, provision is also made for a failure of a central control device to be indicated by a higher-level control center device and/or an operating device associated with the failed central control device. As a result, it is particularly easy to identify merely from the respective operating device whether a central control device has failed and therefore to gain access to the other central control device.

A further advantageous embodiment of the method according to the invention also provides for the first central control device and the at least one further central control device to be connected by means of a data line, and for sign-of-life signals to be transmitted via this data line. In this way, the central control devices can check one another for their correct operation.

In this context, provision may be made for the central control devices to determine a master central control device which, on its own, transmits command sequences to the at least one field device, for the remaining central control devices to identify a failure of the master central control device from a lack of signs of life of the master central control device, and, in the event of failure of the master central control device, to determine a new master central control device. The determination of a master central control device is particularly suitable when command sequences (a plurality of successive commands) or derived commands (commands or responses derived from messages from the field devices) occur. Owing to the mutual monitoring, the central control devices can switch over automatically from a failed central control device to a still functional central control device without the operating personnel of the automation system needing to become involved in this. As a result of the fact that only sign-of-life signals need to be exchanged via the data line provided between the central control devices, no particular requirements are placed on the data line.

The abovementioned object as regards the automation system is achieved by an automation system for operating and/or observing at least one field device having at least two central control devices, which implement the same automation software, at least one field device, which is connected to the central control devices via a data link and receives first and second similar commands produced by the central control devices, and a command identification device, which is associated with the field device and only allows that one of the first and second commands which is received first to be implemented. Such an automation system can be provided with particularly little complexity and therefore cost-effectively owing to the fact that synchronization of the central devices with one another is not required.

The invention will be explained in more detail with reference to the exemplary embodiments below. In the drawings:

DESCRIPTION OF THE PREFERRED EMBODIMENTS

Figure 1:
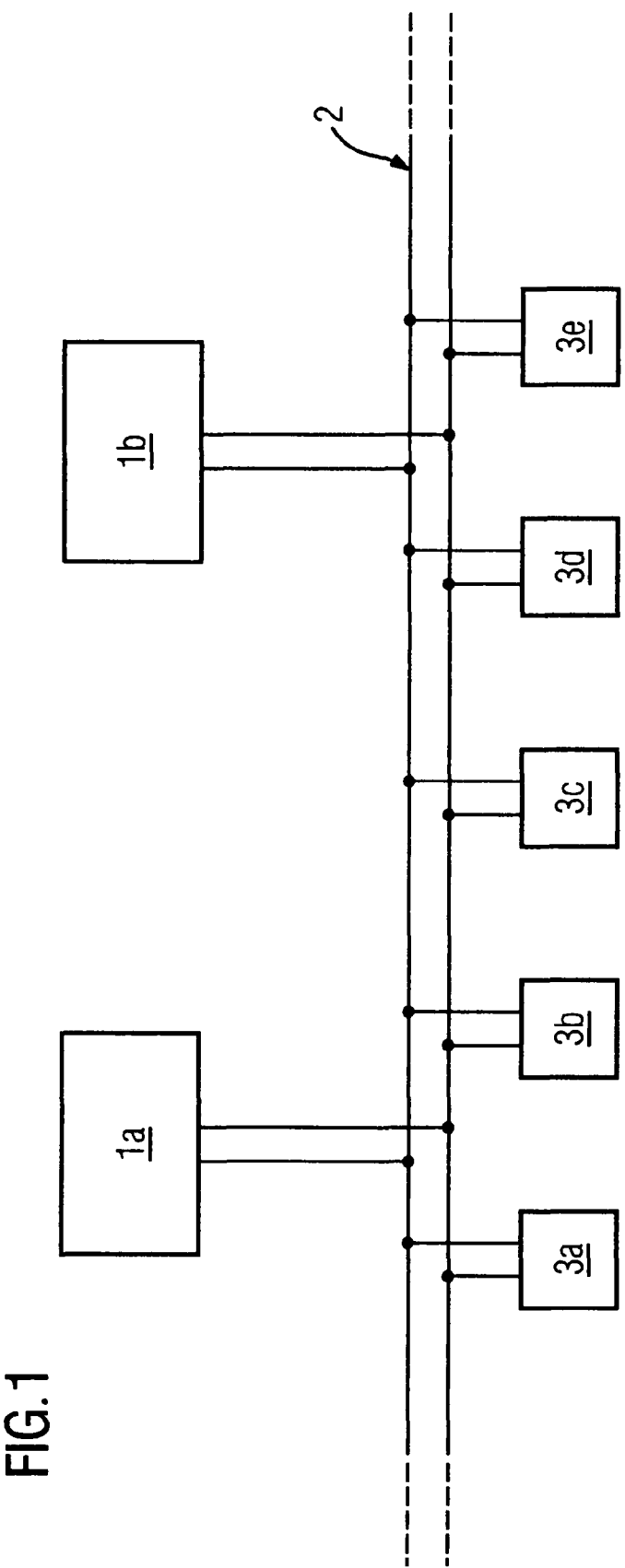
FIG. 1 shows a schematic view of a first exemplary embodiment of an automation system in a block diagram.

The automation system illustrated by way of example in FIG. 1 comprises a first central control device 1a and a second central control device 1b. The central control devices 1a and 1b are connected to field devices 3a to 3e via a data bus 2, which is designed to be redundant. The field devices 3a to 3e are in turn connected to a system to be automated or a process to be automated in a manner which is not illustrated in FIG. 1. In this regard, it is assumed by way of example below that it is an electrical energy supply network which is involved and that the field devices 3a to 3e represent electrical protection and control devices.

In order to control the electrical energy supply network (not illustrated in FIG. 1), first commands are produced by the central control device 1a and second commands are produced by the central control device 1b. In this case, the designation "first" and "second" commands is not intended to indicate a specific sequence in time; they are merely commands which are generated by the first and the second central control device. For this purpose, the two central control devices 1a and 1b implement the same automation software, in this embodiment the devices not functioning synchronously. The commands are transmitted to the field devices 3a to 3e via the data bus 2, which may either be a data bus designed in duplicate or a data bus having a ring structure. Since the central control devices 1a and 1b are not in tune with one another and also do not function synchronously, it may arise that a similar command for a specific field device, for example the field device 3a, is produced both by the first central control device 1a and by the second central control device 1b and is transmitted to the field device 3a. This field device 3a implements the received commands. In the case of specific commands, for example closing of a switch, it is therefore possible to simply implement the command a second time within a very short period of time, which would result in an error message of the nature "switch already closed".

The field devices 3a to 3e are generally also connected to measured value pickups, such as voltage and/or current transformers, for example, in the electrical energy supply network. From these measured value pickups, the field devices 3a to 3e receive measurement signals, which they convert into measurement data and transmit to the central control devices 1a and 1b. Messages, such as confirmations of an implemented action or alarm messages in the event of a specific limit value being exceeded (for example by a measured current), for example, are likewise transmitted to the central control devices 1a and 1b. In this case, all of the measurement data transmitted from the field devices 3a to 3e to the central control devices 1a and 1b are transmitted both to the first central control device 1a and to the second central control device 1b in order that in each case the same database is present in both central control devices 1a and 1b and that they do not need to be matched to one another. Since the central control devices 1a and 1b operate with the same automation software, they also respond to the same input messages in the same way and therefore send back any corresponding similar commands to the field devices 3a to 3e.

Figure 2:
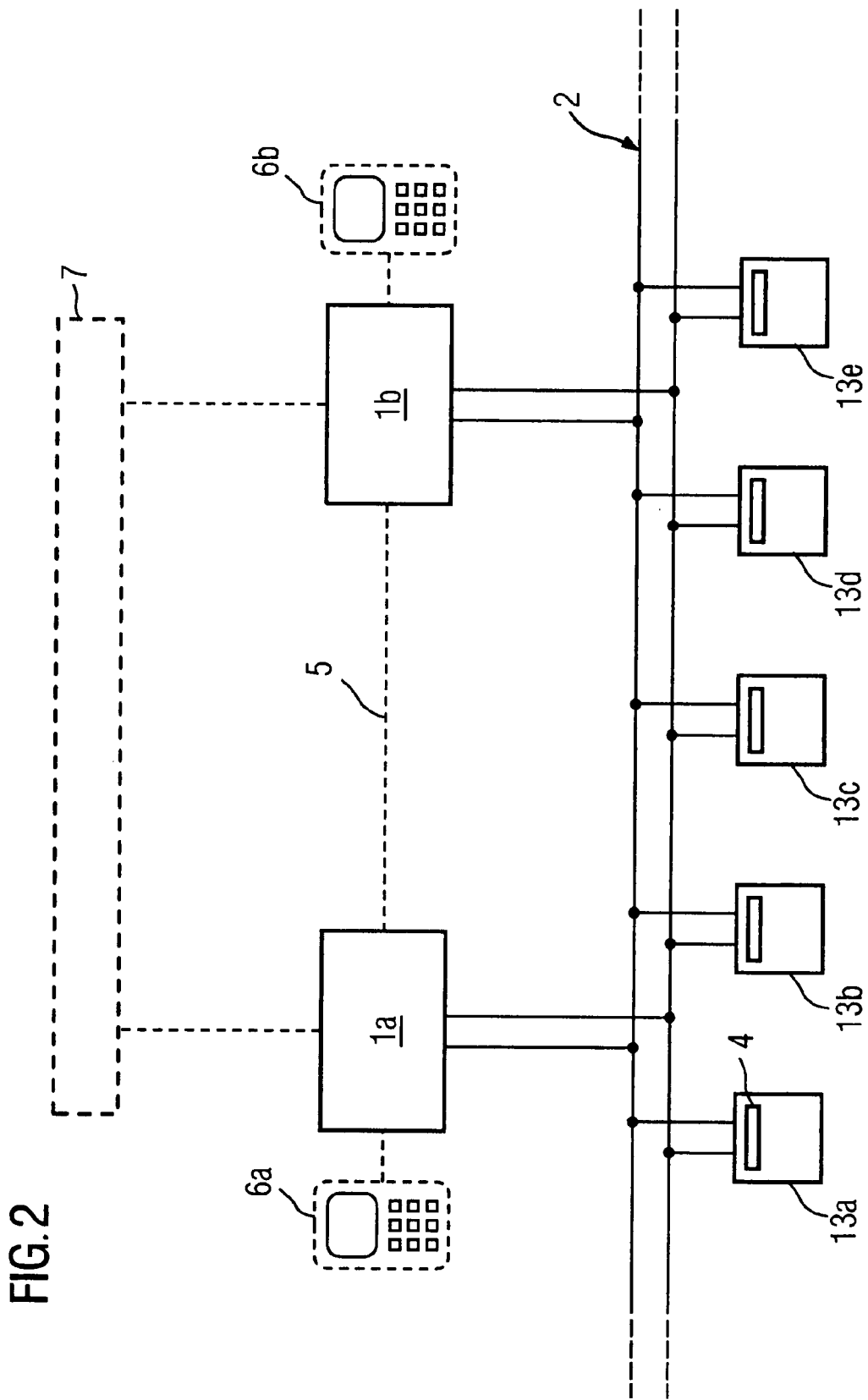
FIG. 2 shows a schematic view of a second exemplary embodiment of an automation system in a block diagram.

FIG. 2 shows a further exemplary embodiment of an automation system. The automation system shown in FIG. 2 differs from that shown in FIG. 1 substantially by a further function of the field devices used, which are therefore identified by the reference symbols 13a to 13e, as a deviation from FIG. 1.

Since precisely in more complex automation systems a field device 13a should implement each command only a single time, as shown in FIG. 2 it checks, using a command identification device 4, which is generally part of the device software of the field device 13a, whether the respectively received command has already been received previously and in this case ignores the received command. In other words, the field device 13a only implements those commands which it receives for the first time. This makes it possible to ensure that the field device 13a implements each command only once and not a plurality of times in succession.

In order not to produce any contradictions when implementing the received first and second commands, the field devices 13a to 13e, for example whilst implementing a command, can block the implementation of further received commands. This may be of high importance, for example, when a command comprising a plurality of subcommands, i.e. a command sequence, is implemented by the respective field device and is not intended to be interrupted by a further command which does not belong to the command sequence. In addition, the simultaneous implementation of two contradictory commands is thus prevented.

Once a command has been carried out, provision may also be made for the field device to prevent the same command from being carried out for a specific period of time after it was carried out for the first time before it accepts the same command another time. This prevents commands which have been sent twice being carried out.

If in particular also so-called derived commands, i.e. commands which are attributed to measurement data and messages from the field devices 13a to 13e, should be capable of being processed in the automation system, it is possible to connect the central control devices 1a and 1b to one another by means of a single data line 5. Via this data line 5, on the one hand, the central control devices 1a and 1b can determine their responsibilities. For this purpose, a central control device, for example the central control device 1a, is determined as the so-called master central control device. This master central control device is hereafter the leading central control device and is responsible for the abovementioned derived commands or else for command sequences. However, provision may also be made for the leading central control device to take on all of the commands to be transmitted to the field devices, while the non-leading central control device, in this case the central control device 1b, does not emit any dedicated commands to the field devices, but moreover carries out the same actions as the leading central control device 1a.

On the other hand, so-called sign-of-life signals can also be transmitted between the central control devices 1a and 1b via the data line 5. This means that each central control device emits a signal at regular intervals in order to communicate to the other central control device that it is still functional. As an alternative to the sign-of-life signals, provision may also be made for a central control device 1a to send an enquiry to the other central control device 1b and wait for a response to the transmitted enquiry. If this response or the sign-of-life signal is not present, it is identified that the corresponding central control device has failed. If the failed central control device is the master central control device, another central control device is nominated the master central control device. In this way, the automation system can continue to function without any time delay.

In addition, local operating devices 6a and 6b can be connected to the central control devices 1a and 1b, which local operating devices 6a and 6b make it possible to locally operate the corresponding central control device. In the event of failure of a central control device, this device indicates the failure to the associated operating device. In this way, the operating personnel are informed of the failure and from then on can input all of the instructions using the further central control device.

The central control devices 1a and 1b can also be connected to a control center device 7, from where they receive instructions which they convert into commands for the electrical field devices 13a to 13e. Likewise, the central control devices 1a and 1b transmit messages and measurement data from the field devices 13a to 13e on to the control center device 7. Failure of a central control device is also indicated in the control center device 7, so that the operating personnel can change over to the second central control device.

If the central control devices, via a data line 5 which is possibly provided, independently identify the failure of a central control device, switchover of the operation to the respectively still intact central control device can also take place automatically and need not be carried out by operating personnel.

Figure 3:
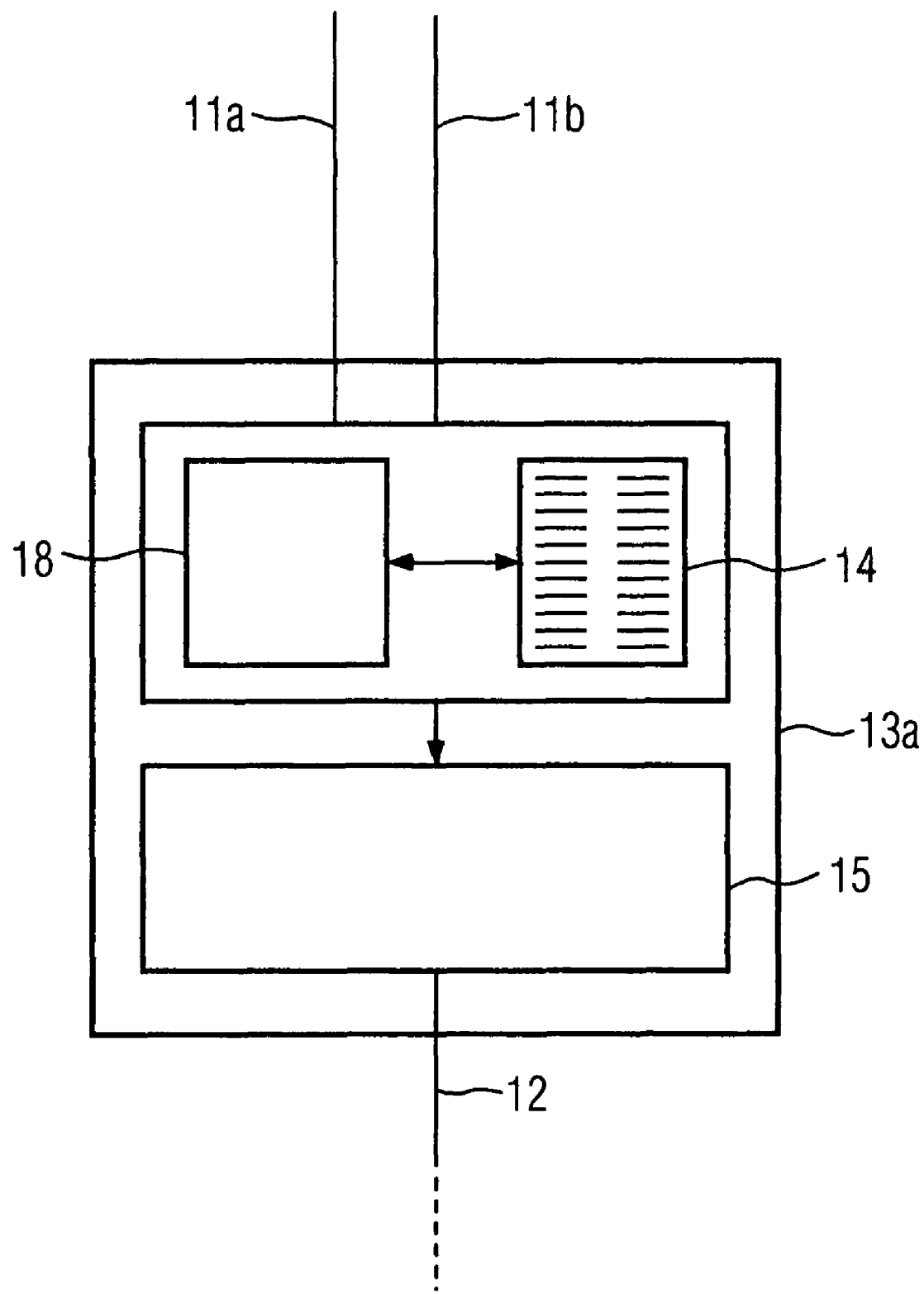
FIG. 3 shows a schematic view of a field device used in the automation system shown in FIG. 2.

FIG. 3 shows an exemplary embodiment illustrating how a field device can be checked to ascertain whether it has already received a received command before. In this regard, FIG. 3 shows, by way of example, the field device 13a, which is connected to the data bus 2 shown in FIG. 1 via redundant connecting lines 11a and 11b. The field device 13a can be connected to sensors and actuators in the electrical energy supply network via a further connecting line 12.

If the electrical field device 13a receives a command from one of the central control devices 1a and 1b via one of the connecting lines 11a or 11b, this command is compared with commands in a list of commands 14 by a test unit 18. The list of commands 14 contains all of those commands which the field device 13a has already received and implemented before. If the test unit 18 determines that the received command is already contained in the list of commands 14, the implementation of this command is prevented. If, however, the test unit 18 determines that the received command is not present in the list of commands 14, the command is transmitted to an implementation unit 15 of the field device 13a and implemented. In addition, the implemented command is included in the list of commands 14. The test device 18, the list of commands 14 and the implementation unit 15 of the field device 13a are generally realized in device software of the field device 13a.

In order not to prevent a command which has been implemented once from ever being implemented again, the commands stored in the list of commands 14, for example, can be deleted again from the list of commands 14 after a predetermined period of time. On the other hand, provision may also be made for only the respective last n commands in the list of commands 14 to be prevented from being implemented by the test unit 18, where n may be a predeterminable number of commands. As a result, it is possible to achieve a situation in which, for example, in each case the last five commands are intended to be prevented from being implemented again. This means that those commands which have been sent to the field device 13a by the two central control devices 1a and 1b are only implemented once. The predeterminable period of time or the predetermined number of commands n is in this case to be selected such that redundant commands, i.e. commands occurring twice, are reliably blocked, but desirable implementation of the same command after a specific time—for example a repeated attempt to reconnect a circuit breaker—is not prevented.

Although the description of the exemplary embodiments is based on, by way of example, two central control devices, it is nevertheless also possible within the context of the invention to use more than two central control devices. The described methods of operation also apply analogously to a plurality of central control devices.

I claim:

1. A method of operating and/or observing at least one field device, the method which comprises:
   producing a first command, with a first central control device implementing automation software, for controlling the at least one field device and transmitting the first command to the at least one field device;
   producing a second command, similar to the first command, for controlling the at least one field device with at least one further central control device implementing the automation software and transmitting the second command to the at least one field device; and
   receiving the first and second commands with the at least one field device and implementing only that command of the mutually similar first and second commands received first by the at least one field device.

2. The method according to claim 1, which comprises generating measurement data and/or messages with the at least one field device and transmitting the measurement data and/or messages to the first central control device and to the at least one further central control device.

3. The method according to claim 1, wherein, during an implementation of a previously received command, the at least one field device blocks an acceptance of further commands.

4. The method according to claim 1, wherein, once a command has been received, the at least one field device blocks an acceptance of a similar command for a predetermined period of time.

5. The method according to claim 1, which comprises storing all implemented commands in a list of commands with the at least one field device, in order to check whether a received command has already been implemented, checking whether the received command is already stored in the list of commands, and blocking an implementation of those commands that are already stored in the list of commands.

6. The method according to claim 5, which comprises blocking the implementation of n last commands that have been stored in the list of commands with the at least one field device, where n is a predeterminable number of commands.

7. The method according to claim 5, which comprises deleting stored commands from the list of commands after a predeterminable period of time.

8. The method according to claim 1, which comprises the following steps to be performed by the central control devices:
   receiving instructions from local operating devices respectively associated therewith and producing the first and second commands for the at least one field device from the instructions; and
   transmitting measurement data and/or messages received from the at least one field device from the central control devices to the local operating devices.

9. The method according to claim 8, which comprises indicating a failure of a central control device by an operating device associated with the failed central control device.

10. The method according to claim 1, which comprises:
    receiving instructions, with the central control devices, from at least one higher-level control center device and producing the first and second commands for the at least one field device from the instructions; and
    transmitting measurement data and/or messages received from the at least one field device from the central control devices to the control center device.

11. The method according to claim 10, which comprises indicating a failure of a central control device by a higher-level control center device and/or an operating device associated with the failed central control device.

12. The method according to claim 1, wherein the first central control device and the at least one further central control device are connected by way of a data line, and the method comprises transmitting sign-of-life signals via the data line.

13. The method according to claim 12, which comprises:
    determining, with the central control devices, a master central control device for transmitting command sequences on its own to the at least one field device;
    identifying, with the remaining central control devices, a failure of the master central control device from a lack of signs of life of the master central control device; and
    in the event of failure of the master central control device, determine a new master central control device with the central control devices.

14. An automation system for operating and/or observing at least one field device, comprising:

at least two central control devices configured to implement the same automation software;

at least one field device connected to said central control devices through a data link and receiving mutually similar first and second commands produced by said central control devices; and a command identification device associated with said at least one field device and allowing implementation of only that command of the first and second commands that is received first.

* * * * *